(12) United States Patent
Lee

(10) Patent No.: US 8,954,644 B2
(45) Date of Patent: Feb. 10, 2015

(54) APPARATUS AND METHOD FOR CONTROLLING MEMORY

(71) Applicant: Foundation of Soongsil University-Industry Cooperation, Seoul (KR)

(72) Inventor: Chan-Ho Lee, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 157 days.

(21) Appl. No.: 13/693,916

(22) Filed: Dec. 4, 2012

(65) Prior Publication Data
US 2013/0151795 A1    Jun. 13, 2013

(30) Foreign Application Priority Data
Dec. 12, 2011 (KR) .................. 10-2011-0132579

(51) Int. Cl.
*G06F 12/00* (2006.01)
*G06F 13/18* (2006.01)
*G06F 13/00* (2006.01)

(52) U.S. Cl.
CPC .................................. *G06F 13/18* (2013.01)
USPC ............................ 711/5; 711/100; 711/154

(58) Field of Classification Search
CPC .............................. G06F 12/00; G06F 13/1047
USPC ...................................... 711/5, 100, 154, 200
See application file for complete search history.

(56) References Cited

U.S. PATENT DOCUMENTS

| 8,671,249 B2 * | 3/2014 | Talagala et al. ............... 711/154 |
| 2008/0091906 A1 * | 4/2008 | Brittain et al. ............... 711/167 |
| 2011/0078360 A1 * | 3/2011 | Rijshouwer et al. ............. 711/5 |

FOREIGN PATENT DOCUMENTS

| JP | 2000172552 A | 6/2000 |
| KR | 1020090020928 A | 2/2009 |

* cited by examiner

*Primary Examiner* — Tuan Thai
(74) *Attorney, Agent, or Firm* — William Park & Associates Patent Ltd.

(57) ABSTRACT

Disclosed herein are an apparatus and method for controlling memory. The apparatus includes a memory access request buffer unit, a memory access request control unit, and a bank control unit. The memory access request buffer unit determines and stores memory access request order so that the plurality of memory access requests is processed in the order of input except that memory access requests attempting to access the same bank and the same row are successively processed. The memory access request control unit reads the memory access requests from the memory access request buffer unit in the determined order, distributes the memory access requests to banks, and transfers the memory access requests to memory. The bank control unit stores a preset number of memory access requests in each of buffer units for respective banks, and controls the operating state of each of the banks.

7 Claims, 8 Drawing Sheets

APPARATUS AND METHOD FOR CONTROLLING MEMORY

PRIORITY

This application claims priority to and the benefit of Korean Patent Application No. 2011-0132579, filed on Dec. 12, 2011, the disclosure of which is incorporated herein by reference in its entirety.

BACKGROUND OF THE INVENTION

1. Field of the Invention

The present invention relates generally to an apparatus and method for controlling memory and, more particularly, to an apparatus and method for controlling memory, which are capable of adaptively processing a plurality of commands to access memory in a system-on-chip (SOC) based system.

2. Description of the Related Art

Because of the worldwide smart phone and tablet personal computer (PC) boom, the development of a variety of application processors (APs) has been brought about, and system-on-chips (SOCs) in a variety of fields have come to have a platform structure similar to that of application processors. Such an SOC is characterized in that a plurality of processors or masters is provided therein and shares single memory. In particular, there are many cases in which the performance of systems for processing multimedia data, such as a moving image or music, or for processing a large amount of data at high speed so as to perform recognition and authentication is dependent chiefly on memory access. That is, if memory does not provide sufficient bandwidth, a master, such as a processor or a hardware accelerator, waits for data and experiences a reduction in performance. If only the bandwidth is problematic, the problem may be solved by using high-speed memory or adding dedicated memory, in which case a new problem, such as an increase in cost or the redesign of a system, frequently occurs. Furthermore, the memory access request of a microprocessor for a general instruction is sensitive to a latency and the memory access request of a multimedia hardware accelerator or a microprocessor for multimedia data is sensitive to the sustainable bandwidth, and thus the requirements are different. In order to solve this problem, the system-level control of memory access requests is required. It is very inefficient for a single processor to receive the states of all masters to arbitrate, and to issue control commands. Another approach is for a memory controller to collect memory access commands and to arbitrate so that system performance is optimized. In this case, the transfer of additional information describing the characteristics of each memory access command is necessary.

ARM's Advanced High-performance Bus (AHB) has been widely used as an interface protocol for the transfer of data inside an SOC. The AHB standard allows up to 16 masters, which is effective when the sum of bandwidths required by respective masters is considerably less than the overall bandwidth. If the sum of bandwidths required by respective masters becomes similar to the bandwidth provided by a network, a problem arises even when there are two masters. Although the bandwidth can be considerably increased using an interconnect matrix, it is hardly helpful in the case in which communication is concentrated on shared memory. Another problem of the AHB resides in the fact that it is impossible to perform the operation of arbitrating memory access requests because another master cannot access memory because of stop-and-wait type communication during single memory access communication, and thus a memory controller should sequentially process memory access requests one by one. Although a number of commands equal to the number of interfaces may be processed at one time by increasing the number of slave interfaces, the improvement of performance is not significant in normal cases because of the limitations in which an interconnect matrix should be used and a response should be made via a channel while the corresponding channel is kept open.

In order to solve the problems of the AHB, ARM's AXI supports outstanding addresses and out-of-order completion communication in a multiple-master system and allows register slicing in a network, thereby enabling high-speed operation. Accordingly, since it is possible to handle another memory access request prior to responding to one memory access request, a memory controller can arbitrate access requests. Using this, the effective bandwidth can be increased by reducing the waiting cycles for memory access, and the demand for Quality of Service (QoS) can be met by adjusting the order of priority.

The prior art related to the above technology will be described in greater detail. Korean Patent Application Publication No. 10-2002-0040150 entitled "Synchronous Dynamic Random Access Memory (SDRAM) controller" discloses a controller that adopts SOC technology and contains a memory controller and a variety of types of data or signal processing devices along with SDRAM, thereby improving data transfer efficiency by solving the discrepancy between the data width and the operating frequency between related chips. However, this technology does not take into consideration of the method or sequence of processing multiple commands that attempt to access SDRAM.

Korean Patent Application Publication No. 10-2001-0019127 entitled "External Bus Controller supporting Burst Transfer using MPC860 Processor and SDRAM and Method Thereof" discloses the structure of an external bus controller that provides the maximum performance of a processor, SDRAM and a peripheral component interconnect (PCI) external bus in a variety of processor boards using MPC860 and SDRAM, and an external bus controller that provides the user programmable machine (UPM) of MPC860. This technology is also different from the present invention that is intended to efficiently process multiple commands that attempt to access SDRAM.

SUMMARY OF THE INVENTION

Accordingly, the present invention has been made keeping in mind the above problems occurring in the prior art, and an object of the present invention is to provide an apparatus and method for controlling memory, which reorder a plurality of memory access requests and then minimize the operations of newly opening a row of a bank, thereby reducing the waiting time and also maximally utilizing the bandwidth.

In order to accomplish the above object, the present invention provides an apparatus for controlling memory, the apparatus adaptively determining order of execution of a plurality of memory access requests, the apparatus including a memory access request buffer unit configured to determine and store memory access request order so that the plurality of memory access requests is processed in order based on input order of the plurality of memory access requests and bank and row information extracted from memory addresses of the memory access requests except that memory access requests attempting to access a same bank and a same row are successively processed; a memory access request control unit configured to read the memory access requests from the memory access request buffer unit in the determined order, to distribute the memory access requests to banks, and to transfer the memory access requests in the banks to memory, thereby executing the memory access requests; and a bank control unit configured to store the memory access requests distributed to the banks within a preset number in each of buffer units for respective banks, and to control an operating state of each bank; wherein the memory access request control unit, when distributing the memory access requests to the banks, determines whether the buffer units of respective banks are not full, and transfers one or more memory access requests to one or more buffer units, even if the memory access requests are located behind in terms of order in the memory access request buffer unit, which are not full.

Additionally, in order to accomplish the above object, the present invention provides a method of controlling memory, the method being performed by an apparatus for controlling memory, which adaptively determines order of execution of a plurality of memory access requests, the method including the steps of (a) reading, by a memory access request control unit, a plurality of memory access requests from a memory access request buffer unit in order; (b) determining, by the memory access request control unit, whether a first bank buffer unit is not full based on first bank information corresponding to a memory address extracted from an n-th memory access request; (c) if the first bank buffer unit is not full, transferring the n-th memory access request to the first bank buffer unit, and, if the first bank buffer unit is full, reading a memory access request, bank information of a memory address of which is a second bank, among memory access requests coming after the n-th memory access request; (d) determining whether a second bank buffer unit is not full, and, if the second bank buffer unit is not full, transferring the memory access request, bank information of a memory address of which is the second bank, to the second bank buffer unit; and (e) storing order in which the memory access requests are transferred to the buffer units for respective banks, thereby sequentially transferring commands of a bank control unit to memory.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
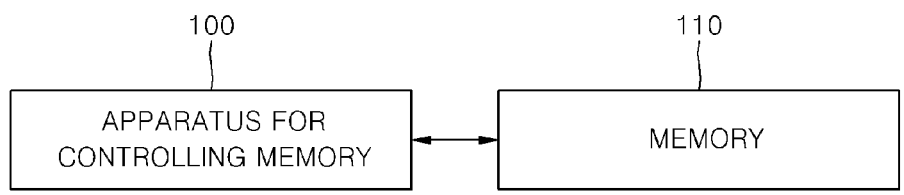
FIG. 1 is a block diagram illustrating the relationship between an apparatus for controlling memory according to the present invention and memory.

Reference now should be made to the drawings, throughout which the same reference numerals are used to designate the same or similar components.

An apparatus and method for controlling memory according to embodiments of the present invention will be described in detail with reference to the accompanying drawings.

Figure 2:
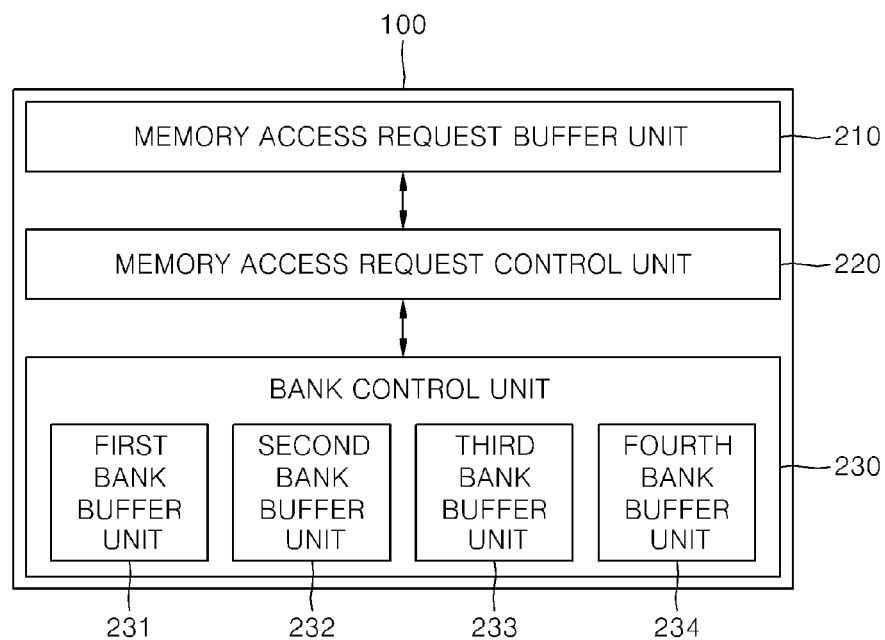
FIG. 2 is a block diagram illustrating the detailed configuration of the apparatus for controlling memory according to the present invention.

FIG. 1 is a block diagram illustrating the relationship between an apparatus 100 for controlling memory according to the present invention and memory 110, and FIG. 2 is a block diagram illustrating the detailed configuration of the apparatus 100 for controlling memory according to the present invention.

Referring to FIGS. 1 and 2, the apparatus 100 for controlling memory according to the present invention includes a memory access request buffer unit 210, a memory access request control unit 220, a bank control unit 230, and buffer units 231, 232, 233, and 234 for respective banks.

The memory access request buffer unit 210 determines and stores memory access requests as ordered based on the input order of a plurality of memory access requests and memory addresses (bank and row information) extracted from the memory access requests. Here, the order of the memory access request may be determined such that the plurality of memory access requests are processed in the order of input except that memory access requests for the same bank and the same row are successively processed. Registers for flags to determine the validity of data, and for the order of execution are connected in a register file structure for memory access requests. Accordingly, when the memory access requests are re-ordered, data is not actually moved, but the order of execution is changed by the updating the execution order values of the register device.

The memory access request control unit 220 sequentially reads the memory access requests from the memory access request buffer unit 210, distributes the memory access requests to the banks, and sequentially transfers the memory access requests to the memory 110 in the order of distribution for the execution of memory access.

When the memory access request control unit 220 distributes memory access requests to the banks, the memory access request control unit 220 checks the buffer units 231, 232, 233, and 234 for respective banks if they are not full, and allows the memory access requests for the buffer units which are not full to be transferred earlier to the corresponding ones of the buffer units 231, 232, 233, and 234 for respective banks. For example, when the first bank buffer unit 231, that is, one of the buffer units 231, 232, 233, and 234 for respective banks, has been filled with a number of memory access requests equal to a preset number (for example, the number of memory access request that can be stored=5), a memory access request attempting to access the first bank cannot be stored any more, and thus a memory access request accessing a bank other than the first bank is searched for. For example, if a bank other than the first bank is a second bank, it is determined whether the second bank buffer unit 232 has been filled with the preset number of memory access requests, and a memory access request attempting to access the second bank is transferred to the second bank buffer unit 232 if the second bank buffer unit 232 is not full. Here, the memory access request control unit 220 stores information about banks to which memory access request information has been transferred, and, when receiving memory access commands from the bank control unit 230 and transferring the memory access commands to the memory, selects the buffer units of the bank control unit 230 in the order of storing and executes the corresponding memory access commands.

Furthermore, if the memory address of a memory access request to be currently processed is in a different row of the same bank with respect to that of the previous memory access request, the memory access request control unit 220 analyzes the memory addresses of memory access requests coming after the memory access request to be currently processed, and transfers a memory access request intended for another bank to the bank control unit 230 before transferring the memory access request to be currently processed. When rows are changed in a bank currently being accessed, waiting cycles are generated. Accordingly, the waiting cycles are reduced by executing an access request for a subsequent bank during waiting cycles that are generated for the access request to be currently processed.

That is, if the memory access request to be currently processed is attempting to access the second row of the first bank and a memory access request read before the memory access request to be currently processed is attempting to access the first row of the first bank, a memory access request attempting to access the second bank, that is, a bank different from the first bank, is searched for among memory access requests coming after the memory access request to be currently processed, and the memory access request attempting to access the second bank is transferred to the memory 110 during the waiting cycles that are generated for the memory access request to be currently processed, thereby allowing the memory access request attempting to access the second bank to be processed first. In this case, the memory access requests should also be stored in the buffer units 231, 232, 233, and 234 for respective banks. If all the buffers for banks are not full, the request attempting to access the first row of the first bank is executed as it is. This provides the advantage of reducing waiting cycles because a waiting command of another bank is executed whenever waiting cycles are generated. Accordingly, since a separate operation is not required for re-ordering and the re-ordering is naturally achieved during the distribution of the requests to the banks, it is easy to implement hardware. This can reduce computational load to re-order the memory access requests of the memory access request buffer unit 210. Furthermore, the memory access request control unit 220 controls the initialization, the refresh and the power down of the memory 110.

The bank control unit 230 stores a preset or smaller number of memory access requests, selected from among the memory access requests distributed to the banks, in each of the buffer units 231, 232, 233, and 234 for respective banks, and controls the operating states of each of the banks. That is, the buffer units 231, 232, 233, and 234 for respective banks store one or more memory access requests based on the address of memory to be accessed, and transfer memory access commands to the memory 110 in response to the control signals of the memory access request control unit 220, thereby adaptively determining the execution order of the plurality of memory access requests. However, there may be no buffer units for respective banks in the bank control unit 230, in which the memory access commands may be sequentially transferred to the memory 110 in response to the control signals of the bank control unit 230 without storing the memory access requests.

Figure 3:
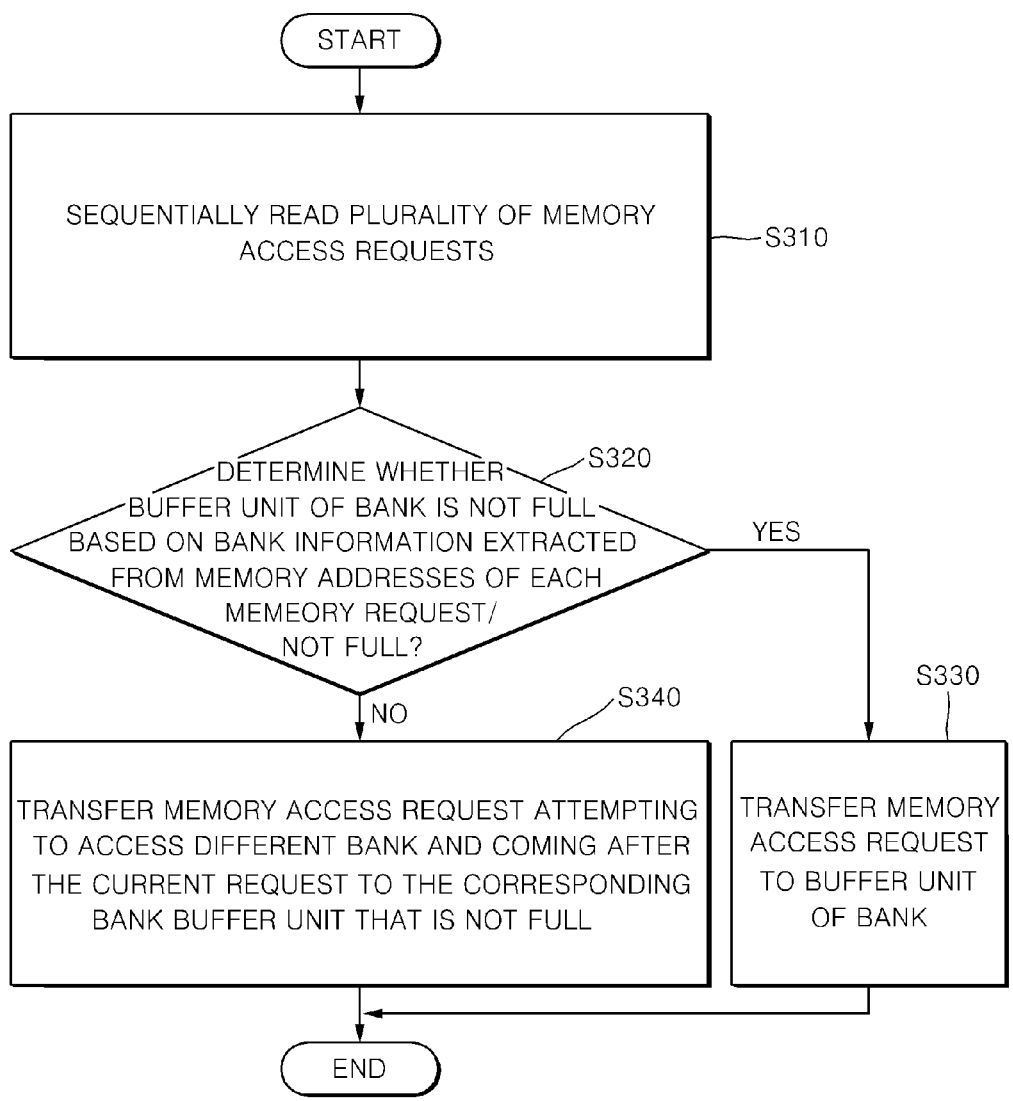
FIG. 3 is a flowchart showing a method of controlling memory according to a first embodiment of the present invention.

FIG. 3 is a flowchart showing a method of controlling memory according to the first embodiment of the present invention.

Referring to FIG. 3, the memory access request control unit 220 sequentially reads a plurality of memory access requests from the memory access request buffer unit 210 at step S310. The memory access request control unit 220 checks whether the first bank buffer unit 231 not full based on bank information (first bank) corresponding to a memory address extracted from the memory access request at step S320. If, as a result of the checking, it is determined that the first bank buffer unit 231 is not full at step S320, the memory access request is transferred to the first bank buffer unit 231 at step S330. In contrast, if, as a result of the checking, it is determined that the first bank buffer unit 231 is full at step S320, a memory access request, the bank information of the memory address of which includes a bank (second bank) other than the first bank, is searched for among requests behind the memory access request. If the other bank (second bank) buffer unit 232 is not full, the memory access request related to the other bank (second bank) is transferred to the other bank (second bank) buffer unit 232 at step S340. As described above, the order in which the memory access requests have been transferred to the buffer units 231 and 232 for respective banks is stored, so that the commands of the bank control unit 230 can be sequentially transferred to the memory.

Figure 4:
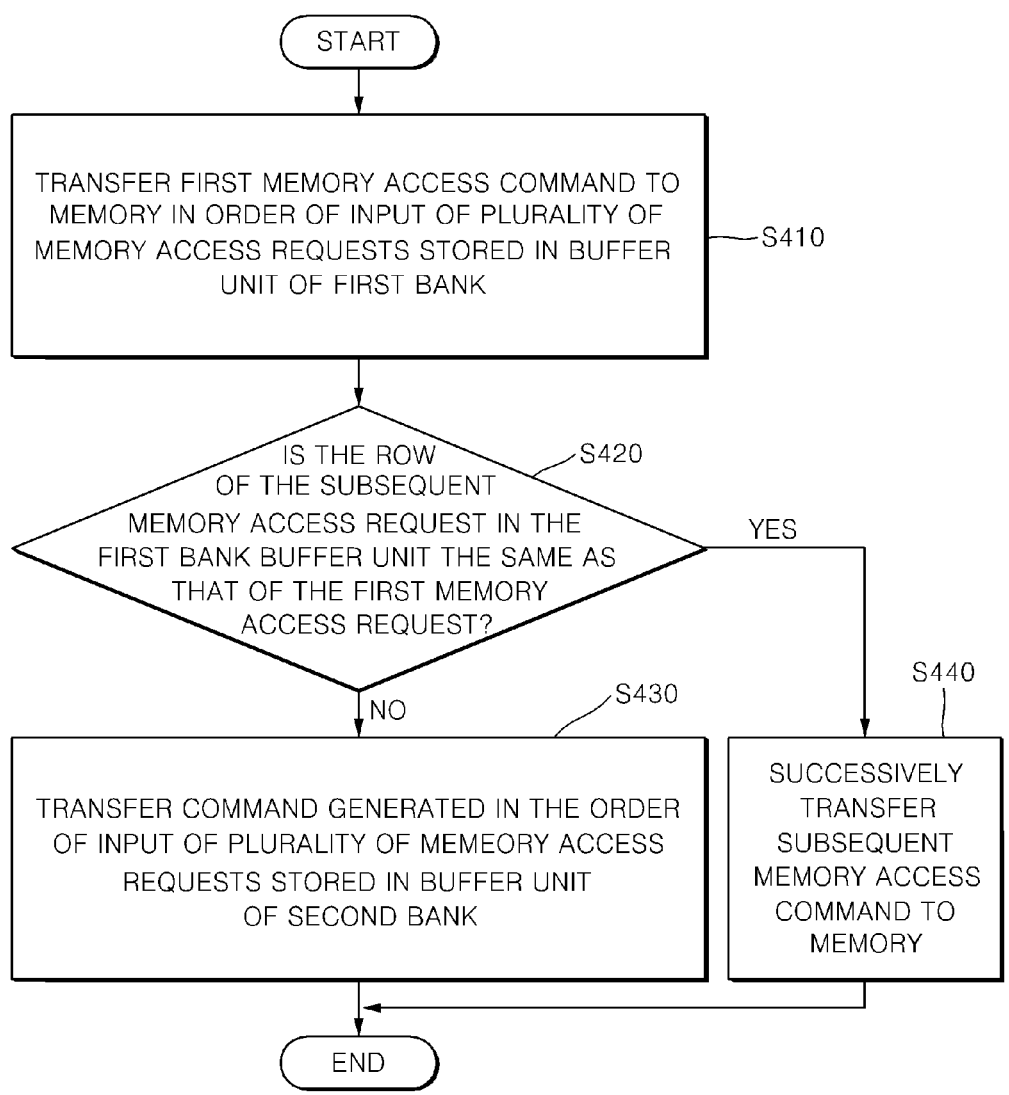
FIG. 4 is a flowchart showing a method of controlling memory according to a second embodiment of the present invention.

FIG. 4 is a flowchart showing a method of controlling memory according to the second embodiment of the present invention.

Referring to FIG. 4, the memory access request control unit 220 transfers the first memory access command to the memory 110 in the input order of a plurality of memory access requests stored in the first bank buffer unit 231 at step S410. The memory access request control unit 220 checks whether the second memory access request stored in the first bank buffer unit 231 is related to the same row as the first memory access request at step S420. If, as a result of the checking, it is determined that the second memory access request is related to the same row as the first memory access request, a subsequent memory access command is transferred to the memory 110 at step 440. In contrast, if, as a result of the checking, it is determined that the second memory access request is not related to the same row as the first memory access request, a precharge and a active commands to change rows are generated and causes waiting cycles. During the waiting cycles that occur when the rows are changed, a command that is generated in the input order of a plurality of memory access requests stored in the second bank buffer unit 232 is transferred to the memory 110 at step 430.

Figure 5:
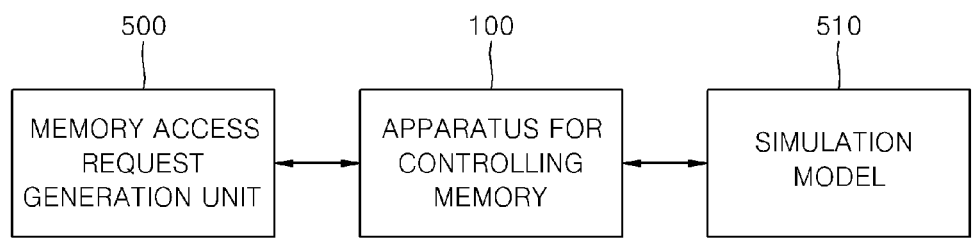
FIG. 5 is a diagram illustrating a simulation environment using the apparatus for controlling memory according to the present invention.

The apparatus 100 for controlling memory according to the present invention is expected to have a great effect when being applied to SDRAM memory. Since the performance might vary depending on an on-chip-network, comparison and analysis are performed in simulation without a network interface. FIG. 5 shows a simulation environment using the apparatus 100 for controlling memory. The memory access request generation unit 500 creates a request operation to be used in simulation and requests the request operation of the apparatus 100 for controlling memory. The apparatus 100 for controlling memory checks the request, and runs a simulation model 510. The simulation model 510 is Micron's MT48LC4M32B2, and is applied to a case in which CAS Latency (CL) is 3 cycles, the burst length is 4, tRCD=2, and tRP=3.

Figure 6:
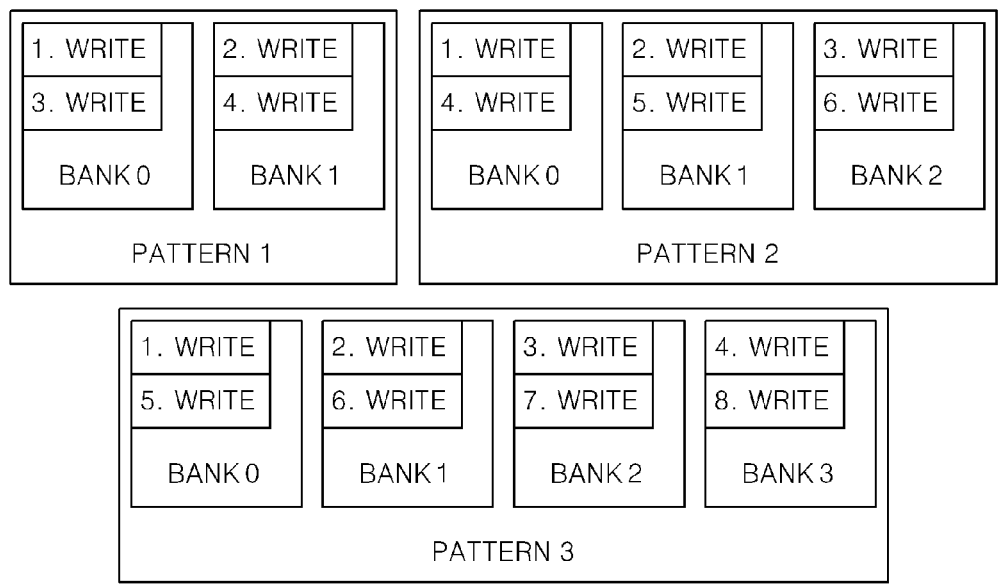
FIG. 6 is a diagram showing data patterns for write operations based on the results of the simulation of the apparatus for controlling memory according to the present invention.
Figure 7:
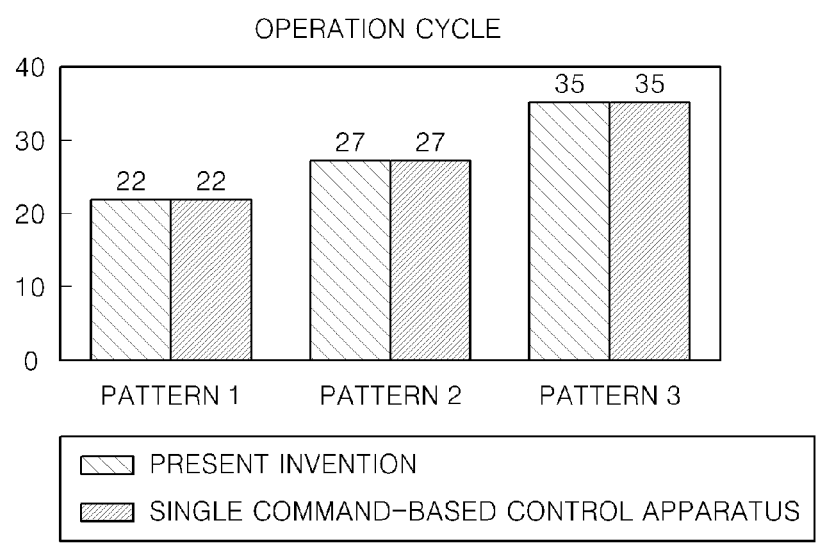
FIG. 7 is a graph showing the results of the simulation of requests for write patterns 1, 2 and 3.

FIG. 6 shows data patterns for write operations for the simulation of the apparatus for controlling memory. In each of the patterns, data is written in ascending order of numbers such as 1, 2, 3, 4, . . . . For example, in pattern 1, a write operation is performed in the order of bank 0, bank 1, bank 0, and bank 1. A single write operation means 4 write bursts. In patterns 2 and 3, write operations of 4 write bursts are sequentially performed on 3 and 4 banks twice, respectively. Patterns 1, 2 and 3 are different from each other in that they use 2, 3 and 4 banks, respectively. FIG. 7 is a graph showing the results of the simulation of requests for write patterns 1, 2 and 3. From this drawing, it can be seen that operation cycles are the same for the same patterns because in the write operation, the entry of data into a FIFO buffer for storing write data is considered to be the completion of the write operation. Accordingly, if there is an not full space in the FIFO buffer for storing write data, the write operation can continue to be performed, and therefore the operation cycles are the same.

Figure 8:
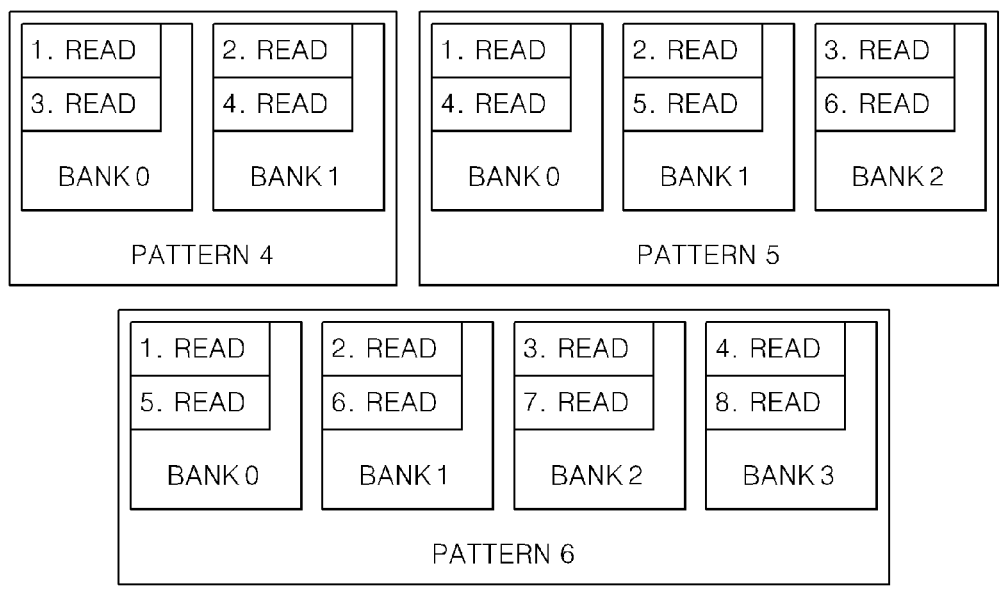
FIG. 8 is a diagram showing data patterns for read operations based on the results of the simulation of the apparatus for controlling memory according to the present invention.

FIG. 8 shows data patterns for read operations for the simulation of the apparatus for controlling memory. These data patterns are the same as the above data patterns for write operations except that "write" has been replaced with "read." While in the case of a write request, communication is considered to be completed when data enters into a FIFO buffer for storing write data, the read request is completed when read data are available at the output of the apparatus 100 after the read request is delivered, and the read operation may be expected to have operation cycles different from those of the write operation.

Figure 9:
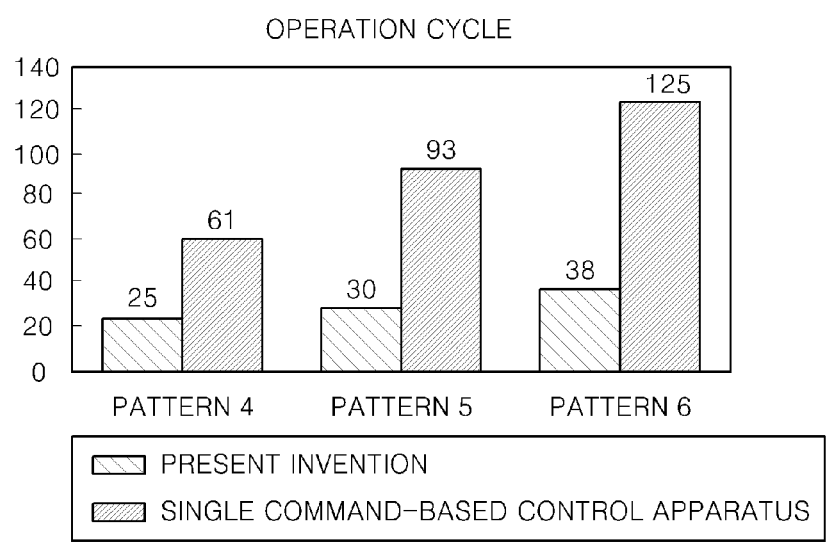
FIG. 9 is a graph showing the results of the simulation of requests for read patterns 4, 5 and 6.

FIG. 9 is a graph showing the results of the simulation of requests for read patterns 4, 5 and 6. In the case of reads, multiple command processing and single command processing exhibit a considerable difference in terms of operation cycles. The difference in the operation cycles is proportional to the number of requests. The reason for this is that in the case of a multiple command-based control apparatus such as the apparatus of the present invention, a subsequent command of the waiting read operation can be sent out immediately after the last command for the previous request has been issued. In contrast, a single command-based control apparatus can make a subsequent request after the read data of the previous request have been completely moved out via a memory control apparatus interface, and thus the memory control apparatus does not perform any task until the next request is received after the last command is sent out. Furthermore, the number of waiting cycles increases in proportion to the number of requests and therefore the difference increases further. In the present invention, the difference in the cycles between patterns 5 and 6 is 8 cycles, which is consistent with the difference between the numbers of data required by patterns 5 and 6, that is, 8. Here, it can be seen that when data are stored among three or more banks in sequence, the number of waiting cycles due to active and precharge operations becomes "0." If two banks are used and the number of access cycle for a bank is equal to or longer than the number of cycles for the active or precharge operation, the number of waiting cycles also becomes "0." It can be seen that in pattern 6, the control apparatus of the present invention completes an operation using operation cycles corresponding to 30% of those of the single command-based control apparatus.

Figure 10:
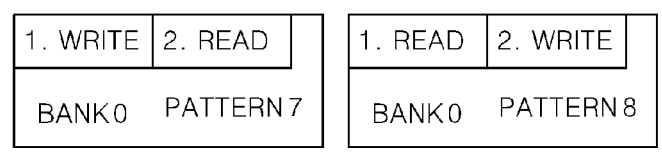
FIG. 10 is a diagram showing the difference in the number of operation cycles between an read-after-write operation and an write-after-read operation performed on the same row, which is obtained by the simulation of the apparatus for controlling memory according to the present invention.
Figure 11:
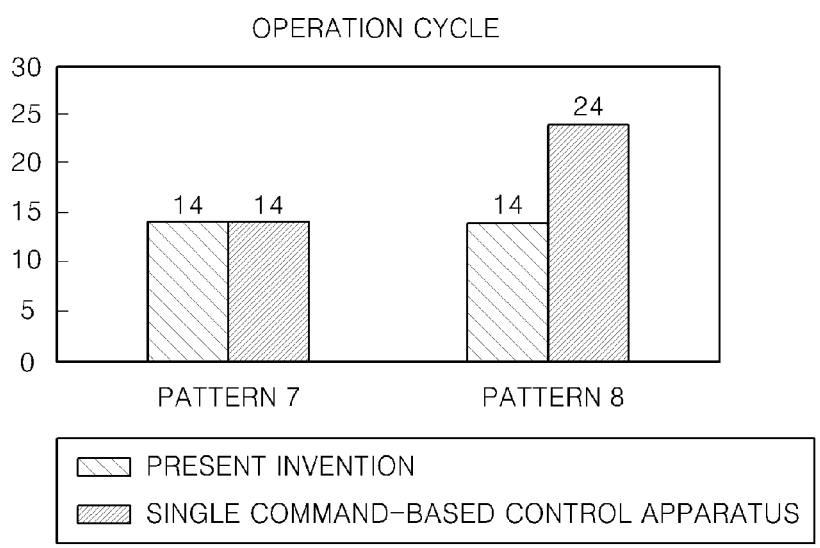
FIG. 11 is a graph showing the comparison between operation cycles for requests for data patterns 7 and 8.

FIG. 10 is a diagram showing the difference in the number of operation cycles between a read-after-write operation and a write-after-read write operation performed on the same row. FIG. 11 is a graph showing the comparison in the number of operation cycles between data patterns 7 and 8. Referring to FIG. 11, in the case of pattern 7 for a read-after-write request, when write data is stored in a write FIFO buffer, the memory access request generation unit 500 can make a read request. While the apparatus for controlling memory is performing a write operation on the memory, a read request may be input to the apparatus for controlling memory, so that the control apparatus of the present invention and the single command-based control apparatus do not show any difference. However, in the case of pattern 8 for a write-after-read request, the control apparatus of the present invention completes the operations using the same cycles as in the case of the read-after-write request, whereas the single command-based control apparatus cannot make a write request until a read operation is completed, thereby exhibiting a degradation in performance due to waiting cycles. In the case of pattern 8, the control apparatus according to the present invention completes a request using operation cycles corresponding to about 58% of those of the single command-based control apparatus.

Figure 12:
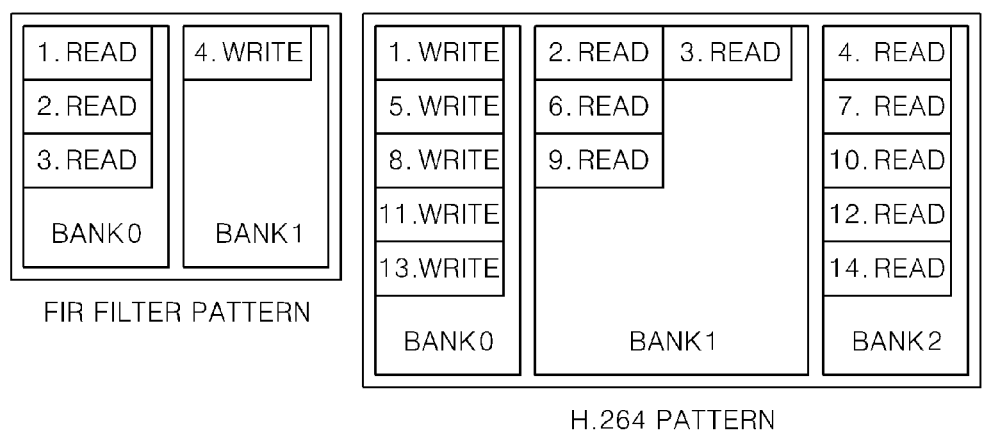
FIG. 12 is a diagram showing data patterns that were extracted from an FIR filter and an H.264 decoder, respectively.
Figure 13:
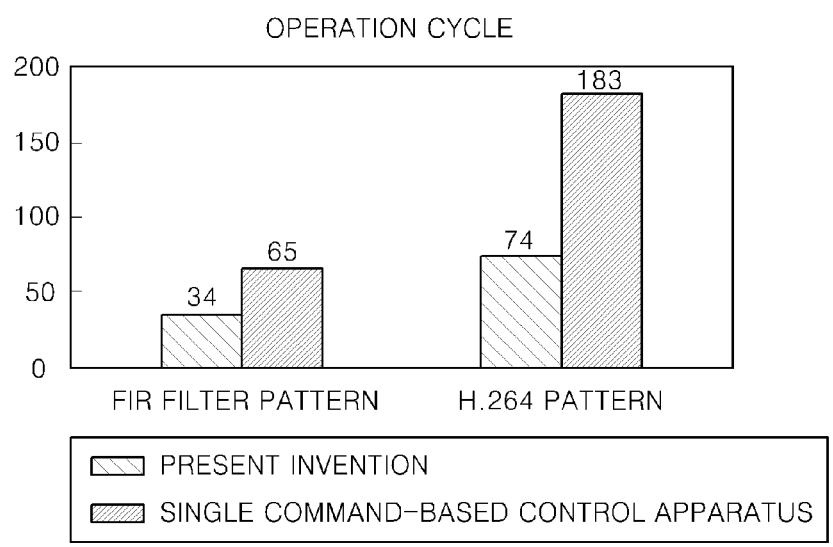
FIG. 13 is a graph showing the comparison between operation cycles for the data patterns of the FIR filter and the H.264 decoder.

FIG. 12 is a diagram showing data patterns that are extracted from an FIR filter and an H.264 decoder, respectively. In order to analyze the differences in performance in real world systems, the differences in the performance for the data patterns of the FIR filter and the H.264 decoder are analyzed. From the results of FIG. 13, it can be seen that the apparatus for controlling memory according to the present invention completes the requests for the data patterns of the FIR filter and the H.264 decoder using operation cycles corresponding to 52% and 40% of those of the single command-based control apparatus. This shows that the apparatus for controlling memory according to the present invention can contribute greatly to the improvement of the performance in the real world application systems.

The present invention may be implemented as computer-readable code stored in a computer-readable storage medium. The computer-readable storage medium includes all types of storage devices in which computer system-readable data is stored. Examples of the computer-readable storage medium are Read Only Memory (ROM), Random Access Memory (RAM), Compact Disk-Read Only Memory (CD-ROM), magnetic tape, a floppy disk, and an optical data storage device. Furthermore, the computer-readable storage medium may be implemented as carrier waves (for example, in the case of transmission over the Internet). Moreover, the computer-readable medium may be distributed across computer systems connected via a network, so that computer-readable code can be stored and executed in a distributed manner.

The apparatus and method for controlling memory according to the present invention are advantageous in that a plurality of memory access requests is re-ordered thereby reducing the waiting cycles and maximally utilizing the bandwidth. Furthermore, the apparatus and method for controlling memory according to the present invention are advantageous in that commands to request memory access are stored in the storage unit and analyzed and the operations of newly opening a row of a bank are minimized, thereby reducing the waiting cycles for the opening of new rows in memory access, increasing the bandwidth, and reducing power consumption. Furthermore, memory access requests can be processed in order of priority.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling memory, the apparatus adaptively determining order of execution of a plurality of memory access requests, the apparatus comprising:
 a memory access request buffer unit configured to determine and store memory access request order so that the plurality of memory access requests is processed in order based on input order of the plurality of memory access requests and bank and row information extracted from memory addresses of the memory access requests;
 a memory access request control unit configured to read the memory access requests from the memory access request buffer unit in the determined order, to distribute the memory access requests to banks, and to transfer the memory access requests in the banks to memory, thereby executing the memory access requests; and
 a bank control unit configured to store the memory access requests distributed to the banks within a preset number in each of buffer units for respective banks, and to control an operating state of each bank;
 wherein the memos access request buffer modifies the memory access request order so that memory access requests attempting to access a same row of same bank are successively processed, and
 wherein the memory access request control unit, when distributing the memory access requests to the banks, determines whether the buffer units of respective banks are not full, and transfers one or more memory access requests to one or more buffer units, even if the memory access requests are located behind in terms of order in the memory access request buffer unit, which are not full.

2. The apparatus of claim 1, wherein the memory access request control unit, if a first bank buffer unit, that is, one of the buffer units for respective banks, is filled with a preset number of memory access requests, searches for a memory access request attempting to access a second bank, and transfers the memory access request attempting to access the second bank to a second bank buffer unit which is not full.

3. The apparatus of claim 1, wherein the memory access request control unit, if a memory address of the memory access request to be currently processed includes a same bank and a different row with respect to a previous memory access request, transfers a memory access request, attempting to access a bank other than the bank and coming after the memory access request to be currently processed, to the memory during waiting cycles that are generated to open a new row.

4. The apparatus of claim 1, wherein each of the buffer units for respective banks stores a plurality of memory access requests.

5. The apparatus of claim 1, wherein the memory access request control unit transfers the memory access requests distributed to the banks to the buffer units for respective banks, and transfers memory access commands to the memory in response to control signals of the bank control unit.

6. A method of controlling memory, the method being performed by an apparatus for controlling memory, which adaptively determines an order of execution of a plurality of memory access requests, the method comprising the steps of:
 (a) reading, by a memory access request control unit, a plurality of memory access requests from a memory access request buffer unit in order;
 (b) determining, by the memory access request control unit, whether a first bank buffer unit is not full based on first bank information corresponding to a memory address extracted from an n-th memory access request;
 (c) if the first bank buffer unit is not full, transferring the n-th memory access request to the first bank buffer unit, and, if the first bank buffer unit is full, reading a memory access request, bank information of a memory address of which is a second bank, among memory access requests coming after the n-th memory access request;
 (d) determining whether a second bank buffer unit is not full, and, if the second bank buffer unit is not full, transferring the memory access request, bank information of a memory address of which is the second bank, to the second bank buffer unit; and
 (e) storing order in which the memory access requests are transferred to the buffer units for respective banks, thereby sequentially transferring commands of a bank control unit to memory,
 wherein the memory access buffer unit determines and stores memory access request order so that the plurality of memory access requests is processed in order based on input order of the plurality of memory access requests and bank and row information extracted from memory addresses of the memory access requests, and modifies the memory access request order so that memory access requests attempting to access a same row of same bank are successively processed.

7. The method of claim 6, wherein step (e) comprises:
 (e1) transferring a first memory access command to the memory in input order of the plurality of memory access requests stored in the buffer units for respective banks, and determining whether a memory address of a second memory access request input after the first memory access request includes a same bank and a same row as those of the first memory access request; and
 (e2) if the memory address of the second memory access request includes a same bank and a same row as those of the first memory access request, successively transferring the second memory access command to the memory, and, if the memory address of the second memory access request includes a same bank and a different row with respect to the first memory access request, transferring a command generated in input order of a plurality of memory access requests stored in the second bank buffer unit to the memory during waiting cycles that are generated to open a new row.

* * * * *